(12) United States Patent
Fujimoto et al.

(10) Patent No.: US 6,473,206 B1
(45) Date of Patent: Oct. 29, 2002

(54) IMAGE SCANNER

(75) Inventors: Hisayoshi Fujimoto, Kyoto (JP); Toshihiko Takakura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/293,083

(22) Filed: Apr. 16, 1999

(30) Foreign Application Priority Data

Apr. 24, 1998 (JP) .............................. 10-115166
Oct. 2, 1998 (JP) .............................. 10-280938

(51) Int. Cl.$^7$ ................................ H04N 1/04
(52) U.S. Cl. ...................... 358/497; 358/475
(58) Field of Search ................. 358/487, 497, 358/474, 483, 471, 506, 509, 475, 505, 494; 250/208.1, 234; 359/201, 205, 210; 355/211, 38, 35, 41, 57, 60, 66, 67, 71

(56) References Cited

U.S. PATENT DOCUMENTS 4,050,780 A * 9/1977 Wei et al. .................... 359/201
5,610,731 A * 3/1997 Itoh ............................ 358/497
5,973,814 A * 10/1999 Ohtake et al. ............... 359/210
6,038,052 A * 3/2000 Arnold et al. ............... 359/205
6,246,492 B1 * 6/2001 Chang et al. ................ 358/497

FOREIGN PATENT DOCUMENTS

| JP | A-6-86010 | 3/1994 |
| JP | A-8-88807 | 4/1996 |

* cited by examiner

Primary Examiner—Cheukfan Lee
(74) Attorney, Agent, or Firm—Merchant & Gould P.C.

(57) ABSTRACT

An image scanner is provided which includes a housing, a document supporting panel fixed to the housing, a movable carriage arranged under the document supporting panel, a light source supported by the carriage for illuminating a document placed on the document supporting panel. The image scanner also includes first reflecting means supported by the carriage and second reflecting means mounted on the housing. Further, the image scanner includes third reflecting means mounted on the housing, a focusing lens supported by the carriage and a line sensor supported by the carriage.

18 Claims, 10 Drawing Sheets

IMAGE SCANNER

BACKGROUND OF THE INVENTION

1. Field of the Invention

The present invention relates to an image scanner, and more particularly, to a flat-bed image scanner.

2. Description of the Related Art

Conventionally, use has been made of various types of flat-bed image scanners for reading out images carried by documents, books and the like. In a flat-bed scanner, an image-carrying document to be read out is placed on a transparent supporting panel. Under the supporting panel, a movable image-reading unit (or carriage) is provided for scanning the document in a secondary scanning direction. FIGS. 9 and 10 of the accompanying drawings show two different types of conventional flat-bed image scanners.

Specifically, FIG. 9 illustrates a conventional image scanner which is provided with a document-supporting glass panel 1 and a carriage 2 arranged under the glass panel 1. The carriage 2 is arranged to move with respect to the glass panel 1 in the secondary scanning direction (indicated by a two-headed arrow).

As illustrated, a light source 3, a focusing lens 4, a line sensor 5 and a plurality of mirrors 6a–6c are all incorporated in the carriage 2. The mirrors 6a–6c are disposed so that the light path extending from an image-reading line L to the focusing lens 4 is rendered long enough.

With such an arrangement, the components 3–5 and 6a–6c held in the carriage 2 will be moved together (i.e., without changing their relative positional relationship) during an image-reading operation. Thus, the length of the above-mentioned light path is kept constant even when the carriage 2 is shifted in the secondary scanning direction. Also, the image-carrying light reflected on the document can accurately be led to the line sensor 5 since the positional relationship between the components 3–5 and 6a–6c is fixed.

FIG. 10 shows a second example of conventional image scanner including a first carriage 2a and a second carriage 2b. The first carriage 2a incorporates a light source 3 and a first mirror 6a, while the second carriage 6b incorporates a second and a third mirrors 6b, 6c. The illustrated image scanner also includes a focusing lens 4 and a line sensor 5 both of which are positionally fixed to the scanner.

When an image-reading operation is performed in the second conventional image scanner, the first carriage 2a is moved through a distance twice as great as a distance through which the second carriage 2b is moved. In this manner, the overall length of the light path extending from an image-reading line L to the focusing lens 4 is kept constant.

The two conventional image scanners described above have been found disadvantageous in the following points.

According to the arrangements shown in FIG. 9, the optical system of the scanner is collectively incorporated in the carriage 2. Thus, in order to lengthen the light path (extending from the image-reading line L to the focusing lens 4) for increasing the depth of focus of the optical system, the carriage 2 will disadvantageously become greater in size.

According to the arrangements shown in FIG. 10, the two carriages 2a, 2b need to be moved at different rates for maintaining the constant length of the light path, as stated above. Thus, a driving mechanism for actuating the carriages 2a, 2b will inevitably become complicated, which is disadvantageous in producing the image scanner.

SUMMARY OF THE INVENTION

It is, therefore, an object of the present invention is to provide an image scanner which eliminates or reduces the above-described problems.

According to the present invention, there is provided an image scanner comprising:

a housing provided with a first and a second side portions which are spaced from each other in a predetermined direction;

a document supporting panel fixed to the housing;

a carriage which is arranged under the document supporting panel and movable in said predetermined direction;

a light source supported by the carriage for illuminating a document placed on the document supporting panel;

first reflecting means supported by the carriage for directing light from the document toward the first side portion of the housing;

second reflecting means arranged at the first side portion of the housing for directing light from the first reflecting means toward the second side portion of the housing;

third reflecting means arranged at the second side portion of the housing for directing light from the second reflecting means toward the first side portion of the housing;

a focusing lens supported by the carriage for converging light from the third reflecting means; and a line sensor supported by the carriage for receiving the converged light.

According to a preferred embodiment, the first reflecting means comprises a first mirror, the second reflecting means comprises a second and a third mirrors, and the third reflecting means comprises a fourth and a fifth mirrors.

These mirrors may be replaced with a suitable number of prisms.

According to the preferred embodiment, the first mirror is arranged to direct light to the second mirror, the second mirror being arranged to direct light to the third mirror, the third mirror being arranged to direct light to the fourth mirror, the fourth mirror being arranged to direct light to the fifth mirror, the fifth mirror being arranged to direct light to the focusing lens.

The focusing lens may have an optical axis extending through the line sensor.

In the preferred embodiment, the second mirror is arranged under the third mirror, the fourth mirror being arranged above the fifth mirror.

Alternatively, the second mirror may be arranged above the third mirror, while the fourth mirror may be arranged under the fifth mirror.

According to another preferred embodiment, the image scanner may further comprise additional reflecting means mounted on the carriage for conducting the light converged by the focusing lens to the line sensor.

In the above instance, the additional reflecting means may comprise at least one additional mirror.

Preferably, the additional reflecting means may comprise two additional mirrors. One of the additional mirrors may be arranged adjacent to the focusing lens, while the other of the additional mirrors may be arranged adjacent to the line sensor.

In a preferred embodiment, the, focusing lens and the line sensor may be offset from each other in a direction perpendicular to said predetermined direction.

In the above instance, said one of the additional mirrors may be spaced from the focusing lens in said predetermined direction, while said the other of the additional mirrors may be spaced from the line sensor in said predetermined direction.

Preferably, the image scanner of the present invention may further comprise driving means provided in the housing for reciprocating the carriage in said predetermined direction.

The driving means may include a pair of racks fixed to the housing, a pair of pinions which are rotatably supported by the carriage and held in engagement with the racks, a motor mounted on the carriage for rotating the pinions, and a speed-reduction mechanism mounted on the carriage and associated with the pinions and the motor.

Advantageously, the housing may include a cover member and a base member separate from the cover member.

Preferably, the third and the fourth mirrors may be attached to the cover member, while the second and the fifth mirrors may be attached to the base member.

Preferably, the light source may comprise a cold-cathode tube or a xenon lamp.

Preferably, the line sensor may: be provided with red, green and blue light-receiving elements for detecting color images.

Other objects, features and advantages of the present invention will become clearer from the detailed description of preferred embodiments given below with reference to the accompanying drawings.

DETAILED DESCRIPTION OF THE PREFERRED EMBODIMENTS

The preferred embodiments of the present invention will be described below with reference to FIGS. 1–8 of the accompanying drawings.

Reference is first made to FIGS. 1–5 illustrating an image scanner according to a first embodiment of the present invention.

Figure 1:
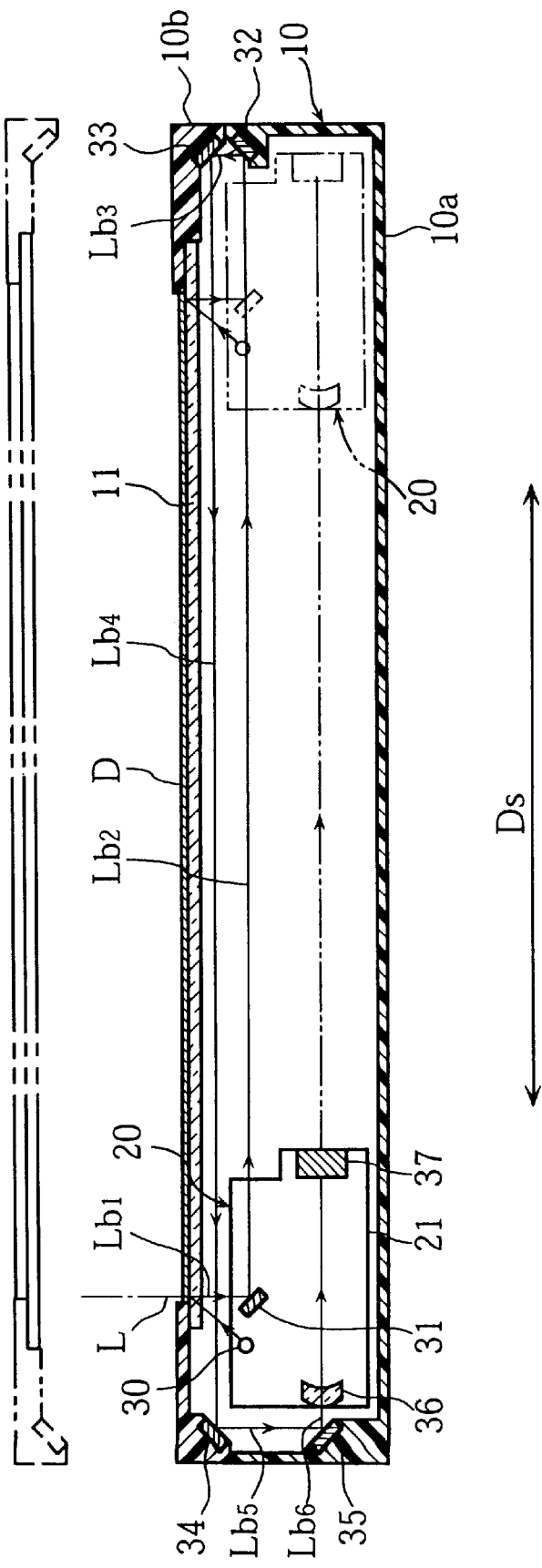
FIG. 1 is a sectional side view showing an image scanner according to a first embodiment of the present invention.

Referring to FIG. 1, the illustrated image scanner includes a housing 10 having a rectangular parallelepipedic configuration. As can be seen from the figure, the housing 10 is made up of two separate members, namely a base member 10a and a cover member 10b. The base member 10a is an upwardly open box-like component. The cover member 10b is formed with an opening, so that a transparent glass panel 11 fixed to a lower side of the cover member 10b is upwardly exposed. The opening of the cover member 10b is large enough to accommodate a document D placed on the glass panel 11. The document D may have a standardized size (DIN A4size for example).

Figure 2:
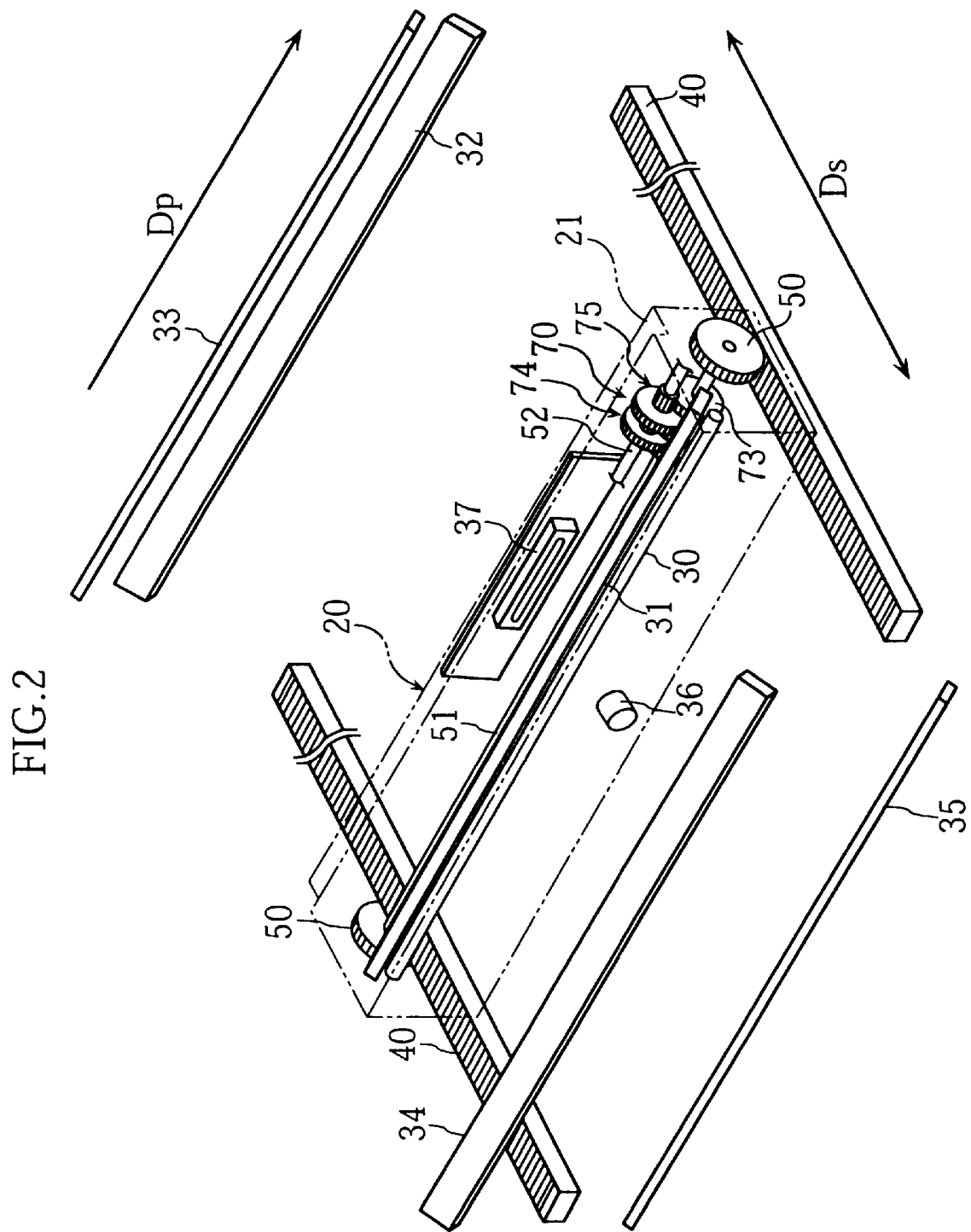
FIG. 2 is a perspective view showing principal components of the image scanner of FIG. 1.

The image scanner also includes a carriage 20 which is arranged under the glass panel 11 and may be made of a resin material. As will be described later, the carriage 20 is movable in a secondary scanning direction Ds which is perpendicular to a primary scanning direction Dp. As shown in FIG. 2, the carriage 20 comprises a box-like casing 21 elongated in the primary scanning direction Dp. The casing 21 is provided with a light source 30 for illuminating the document D.

Further, the casing 21 contains a first reflecting means 31, a focusing lens 36 and a line sensor 37. The first reflecting means 31 may be an elongated, rectangular mirror (called "first mirror" hereinafter) having a flat reflecting surface.

As shown in FIG. 2, the light source 30 is an elongated component extending in the primary scanning direction Dp. Preferably, the light source 30 may be a cold-cathode tube or a xenon lamp capable of emitting white light. The light source 30 has a predetermined length corresponding to the width of the document D. In use, the light source 30 illuminates a narrow, strip-like region of the document D (which region may be referred to as "image-reading line L" hereinafter).

Referring back to FIG. 1, the light emitted from the light source 30 is reflected on the document D, travels downwardly along a first light path Lb1 and is reflected on the first mirror 31. The light reflected on the first mirror 31 travels horizontally along a second light path Lb2. To this end, the first mirror 31 is inclined at an angle of 45° with respect to a vertical line.

The image scanner is further provided with a second reflecting means arranged at a side portion of the housing 10 and a third reflecting means disposed at another side portion of the housing 10 that is spaced from the, first-mentioned side portion in the secondary scanning direction Ds. In the illustrated embodiment, the second reflecting means includes a second mirror 32 and a third mirror 33, while the third reflecting means includes a fourth mirror 34 and a fifth mirror 35.

As shown in FIG. 1, the second mirror 32 and the fifth mirror 35 are fixed to the base member 10a, whereas the third mirror 33 and the fourth mirror 34 are fixed to the cover member 10b. The second mirror 32 is arranged so that the light coming along the second light path Lb2 is reflected upwardly along a third light path Lb3. The third mirror 33, which is located above the second mirror 32, is arranged so that the light coming along the third light path Lb3 is reflected horizontally along a fourth light path Lb4 toward the opposite side portion of the housing 10. The fourth mirror 34 is arranged so that the light coming along the fourth light path Lb4 is reflected downwardly along a fifth light path Lb5. The fifth mirror 35, which is located below the fourth mirror 34, is arranged so that the light coming along the fifth light path Lb5 is reflected horizontally along a sixth light path Lb6 toward the focusing lens 36.

In the first embodiment, the optical axis of the focusing lens 36 extends through the line sensor 37. For the focusing lens 36, use may be made of a convex lens (or a lens system including a plurality of lenses), so that the light reflected from the fifth mirror 35 is suitably converged before it is received by the line sensor 37.

In the above arrangement, the line sensor 37 can be smaller in length than the first to the fifth mirrors 31–35, as shown in FIG. 2. The line sensor 37 may be a CCD color sensor arranged to read out an A4-size document with a resolution of 600 dpi. For reading out color images, the line sensor 37 may be provided with red, green and bue light-receiving elements.

According to the present invention, the carriage 20 is caused to reciprocate in the secondary scanning direction Ds by a mechanism described below.

Referring to FIG. 2, a pair of racks 40 is mounted on a bottom surface of the housing 10. As illustrated, the two racks 40 are spaced from each other in the primary scanning direction Dp, and each of the tracks is elongated in the secondary scanning direction Ds. Two pinions 50 are provided adjacent to lengthwise end walls of the carriage 20 for engagement with the racks 40. The pinions 50 are rotated forwardly and backwardly by a DC motor 60 mounted on the carriage 20 (see FIGS. 3–5). For controlling the rotational operation of the pinions 50, use is made of a speed-reduction mechanism 70 linking the DC motor 60 and the pinions 50.

The pinions 50 are fixed to the respective ends of a pinion shaft 51 which is rotatably supported by the casing 21. As shown in FIG. 2, the pinion shaft 51 extends longitudinally of the casing 21.

Figure 5:
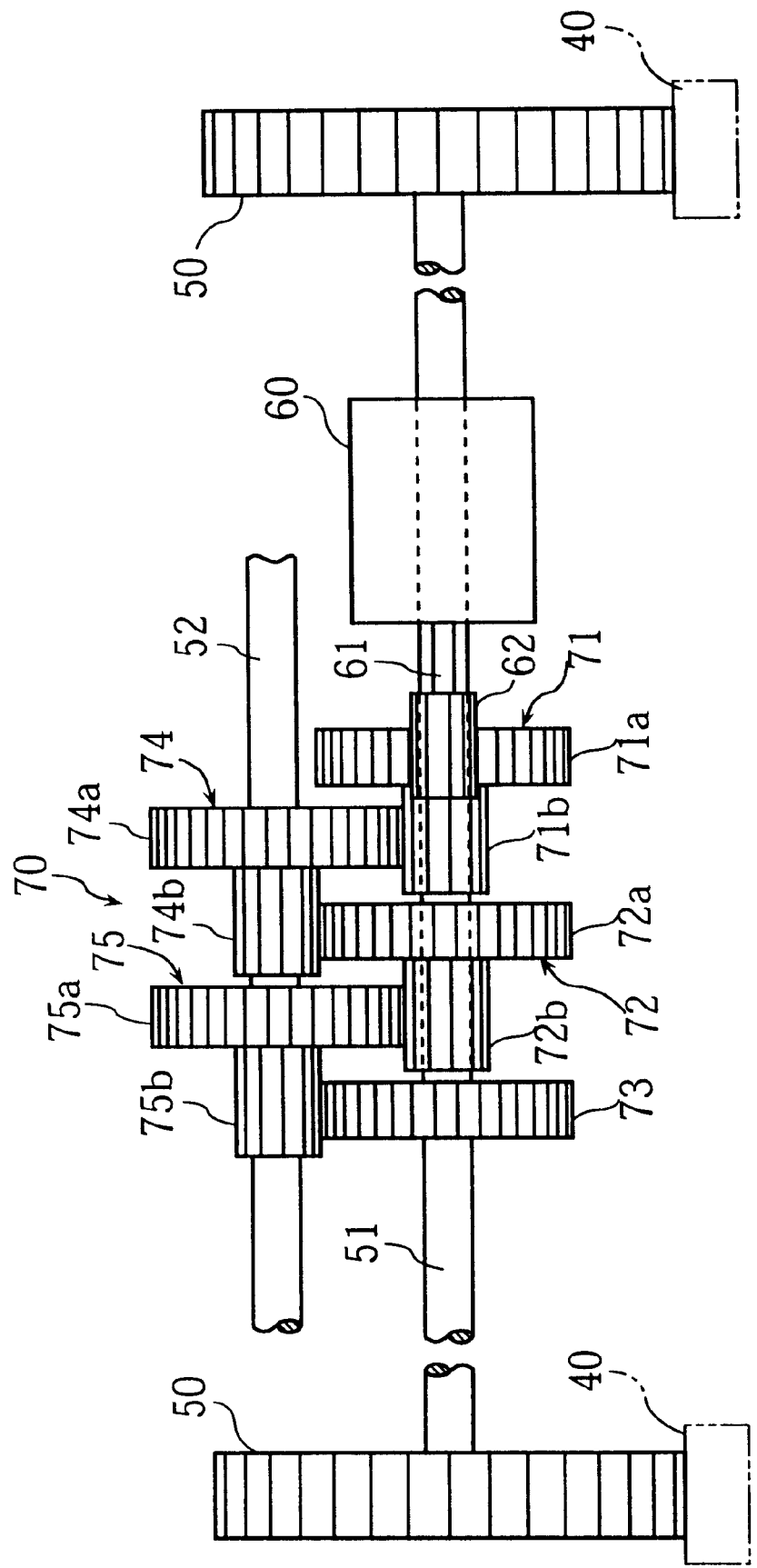
FIG. 5 is a front view showing a driving mechanism of the above carriage.

As best shown in FIG. 5, the pinion shaft 51 externally supports a first gear 71, a second gear 72 and a third gear 73. The first gear 71 and the second gear 72 are not fixed to the pinion shaft 51, thereby enabling free rotation relative to the pinion shaft 51. On the other hand, the third gear 73 is fixed to the pinion shaft 51, so that the third gear 73 is rotated together with the pinion shaft 51.

As illustrated in FIG. 5, the first gear 71 is provided with a diametrically larger gear portion 71a and a diametrically smaller gear portion 71b. Similarly, the second gear 72 is provided with a diametrically larger gear portion 72a and a diametrically smaller gear portion 72b.

Figure 3:
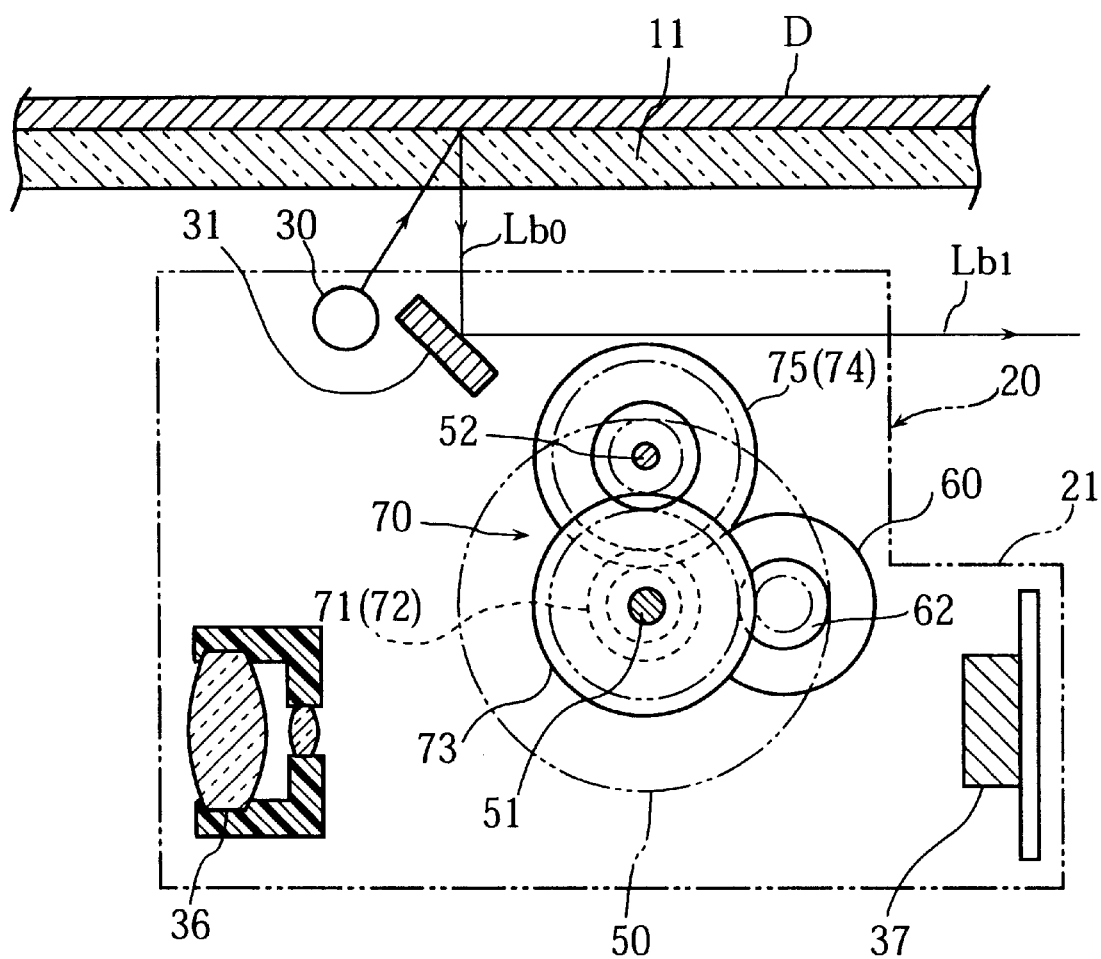
FIG. 3 is a sectional side view showing the arrangements of a carriage used for the image scanner of FIG. 1.
Figure 4:
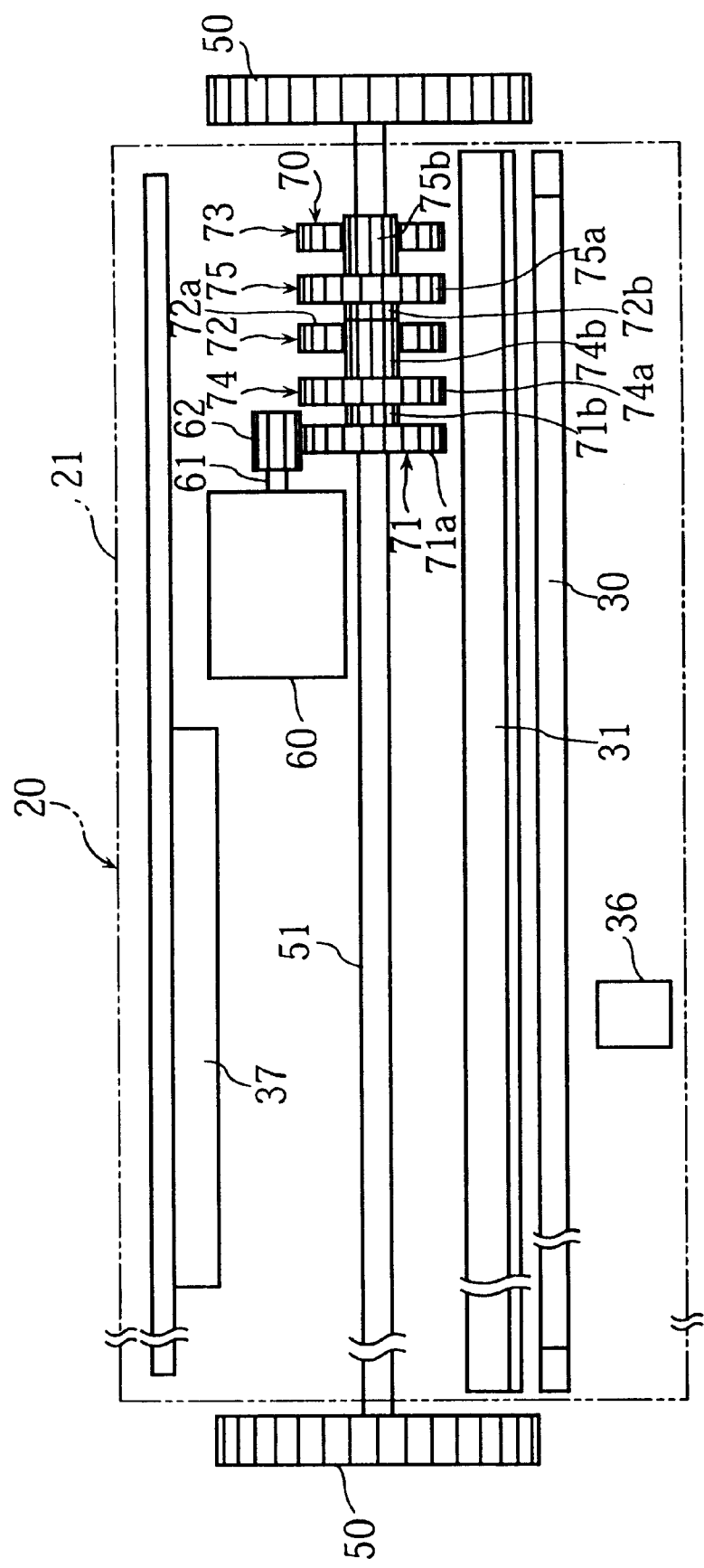
FIG. 4 is a plan view showing the arrangements of the above carriage.

Above the pinion shaft 51, another shaft 52 extending in parallel to the pinion shaft is provided for externally supporting a fourth gear 74 and a fifth gear 75 (see FIGS. 3 and 5). The fourth gear 74 is provided with a diametrically larger gear portion 74a and a diametrically smaller gear portion 74b, while the fifth gear 75 is provided with a diametrically larger gear portion 75a and a diametrically smaller gear portion 75b. The fourth and the fifth gears 74, 75 are not fixed to the shaft 52, thereby enabling free rotation relative to the shaft 52.

As shown in FIG. 5, the smaller gear portion 71b is held in engagement with the larger gear portion 74a. The smaller gear portion 74b is held in engagement with the larger gear portion 72a. The smaller gear portion 72b is held in engagement with the larger gear portion 75a. The smaller gear portion 75b is held in engagement with the third gear 73.

The DC motor 60 is provided with an output shaft 61 to which a pinion 62 is attached. The pinion 62 is held in engagement with the larger gear 71a of the first gear 71.

Upon actuation of the motor 60, the rotation of the output shaft 61 of the motor will be transmitted to the pinion shaft 51 through the speed-reduction mechanism 70. Thus, the pinions 50 fixed to the pinion shaft 51 are rotated forwardly and backwardly, thereby causing the carriage 20 to reciprocate in the secondary scanning direction Ds.

According to the present invention, the overall length of the light paths extending from the image-reading line L to the line sensor 37 is kept constant, whatever positions the carriage 20 takes in the secondary scanning direction Ds. The reason is as follows.

Referring to FIG. 1, the length of the first light path Lb1 is constant since the carriage 20 is moved in the secondary scanning direction in parallel to the flat glass panel 11. Further, since the second to the fifth mirrors 32–35 are fixed to the housing 10, the respective lengths of the third to the fifth light paths Lb3–Lb5 are constant (which means that the sum of these lengths is also constant).

On the other hand, the respective lengths of the second and the sixth light paths Lb2, Lb6 will vary depending upon where the carriage 20 is located in the second scanning direction Ds. However, the sum of these two lengths is kept constant for the following reason.

As previously stated, the first mirror 31 and the focusing lens 36 are attached to the same carriage 20. Thus, as viewed horizontally in the second scanning direction Ds, the first mirror 31 and the focusing lens 36 are moved through the same distance when the carriage is shifted in the second scanning direction Ds. This means that the variations in the lengths of the second and the sixth light paths Lb2, Lb6 are canceled out. Therefore, the sum of the lengths of the second and the sixth light paths Lb2, Lb6 is kept constant.

In view of the above explanation, it can be understood that the overall length of the light paths (extending from the image-reading line L to the line sensor 37 via the first to the fifth mirrors 31–35 and the focusing lens 36) is kept constant, regardless of the positions of the carriage 20 in the second scanning direction Ds.

With such an arrangement, read-out images of the document D can be focused onto the line sensor 37 with constant accuracy even when the carriage 20 is moved in the second-scanning direction Ds.

Figure 9:
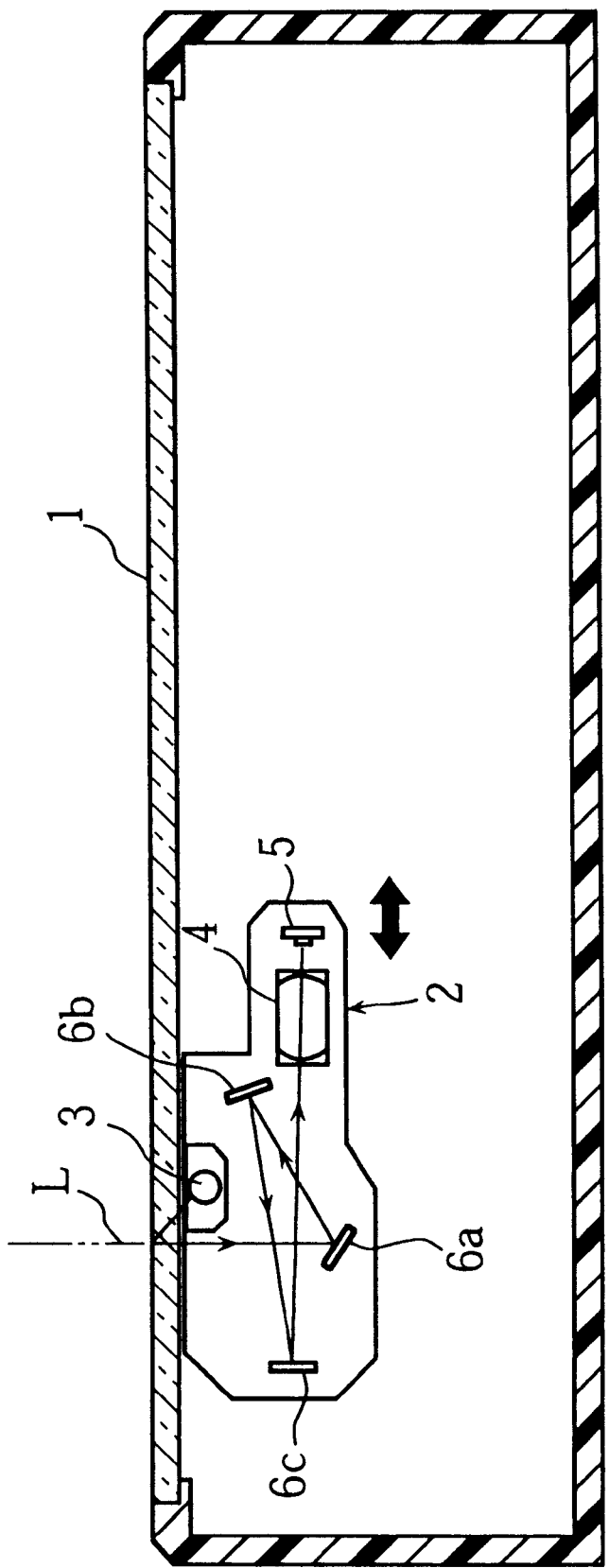
FIG. 9 is a sectional side view showing a first example of conventional image scanner.
Figure 10:
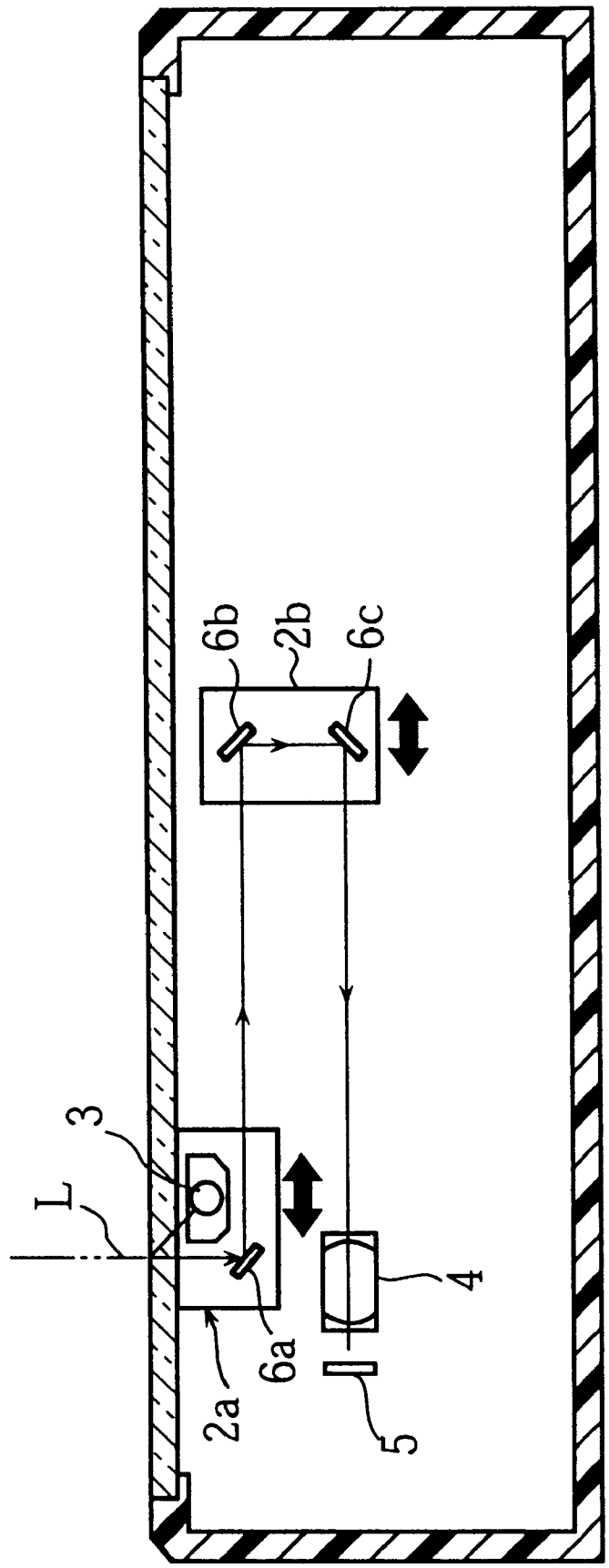
FIG. 10 is a sectional side view showing a second example of conventional image scanner.

The image scanner of the present invention also has the following advantage. As seen from FIG. 1, the overall length of the light paths is rendered greater than is conventionally possible (see FIGS. 9 and 10). Such an arrangement is advantageous in increasing the depth of focus of the optical system of the image scanner. With an increased depth of focus, the images of the document D are properly read out even when part of the document is unduly raised above the glass panel 11.

Further, in the first embodiment of the present invention, the housing 10 is made up of two separate members 10a, 10b which are releasably attached to each other. Thus, the cover member 10b is advantageously detached from the base member 10a for carrying out maintenance of the inner arrangements of the image scanner.

Still further, the image scanner of the present invention incorporates the above-described carriage-actuating mechanism enabling the carriage 20 to move on the racks 40. Clearly, the carriage-actuating mechanism can be used not only for driving the carriage 20 but for supporting the weight of the carriage 20. Thus, the image scanner of the present invention can be made smaller in size (especially in thickness) than is conventionally possible.

In addition, the carriage-actuating mechanism of the present invention does not use a driving belt for pulling the carriage 20 in the second scanning direction Ds. (A driving belt would be unduly stretched during a carriage-driving operation and even come out of engagement with a rotating gear associated with the driving belt.) Thus, it is possible to accurately perform the positioning of the carriage 20 in the second scanning direction Ds.

Figure 6:
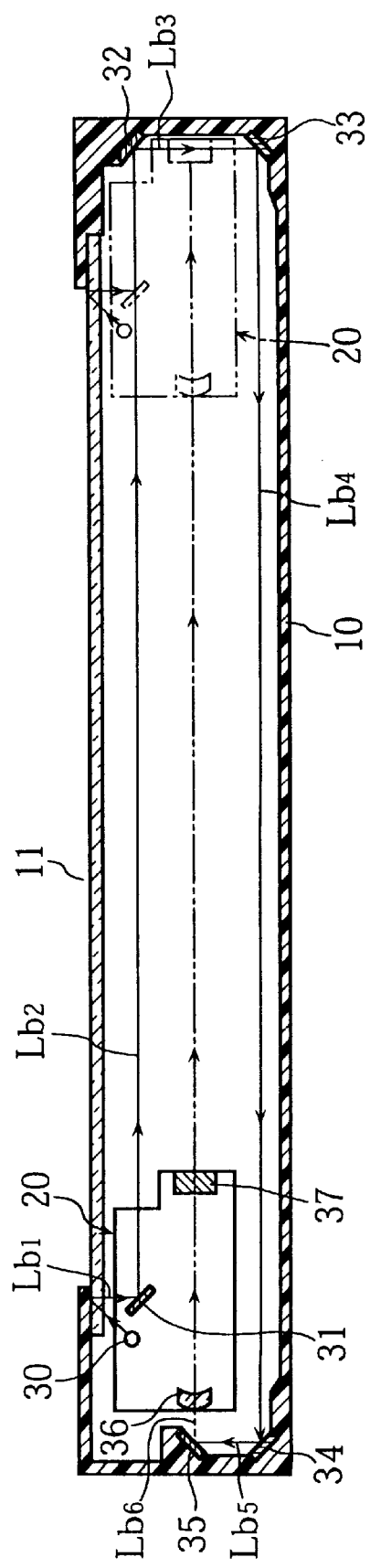
FIG. 6 is a sectional side view showing an image scanner according to a second embodiment of the present invention.

Reference will now be made to FIG. 6 illustrating an image scanner according to a second embodiment of the present invention. The arrangements of the illustrated image scanner are basically similar to those of the first embodiment, except for the light paths.

Specifically, according to the second embodiment, a second mirror 32 is arranged above a third mirror 33, while a fourth mirror 34 is arranged below a fifth mirror 35. In this arrangement, light coming from a first mirror 31 along a second light path Lb2 is reflected downwardly by the second mirror 32 to travel along a third light path Lb3.

Then, the light is reflected horizontally (to the left in FIG. 6) by the third mirror 33 to travel along a fourth light path Lb4. Then, the light is reflected upwardly by the fourth mirror 34 to travel along a fifth light path Lb5. Finally, the light is reflected horizontally (to the right in FIG. 6) by the fifth mirror 35 to travel along a sixth light path Lb6. With such an arrangement, it is possible to obtain the same advantages as those in the image scanner of the first embodiment.

Figure 7:
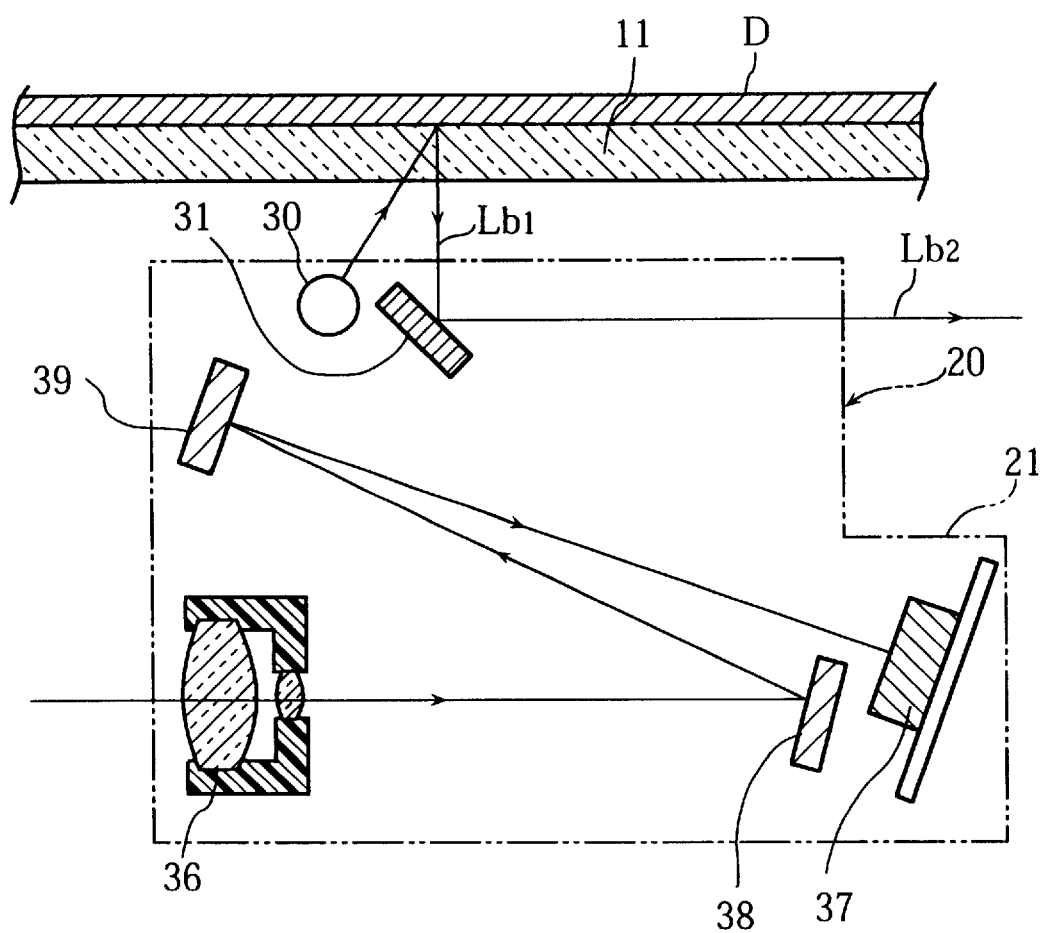
FIG. 7 is a sectional view illustrating principal components of an image scanner according to a third embodiment of the present invention.

FIG. 7 shows principal components of an image scanner according to a third embodiment of the present invention. The image scanner of the third embodiment is basically similar to those of the first and the second embodiments. However, the former image scanner differs from the latter two image scanners in the following point.

Specifically, as shown in FIG. 7, use is made of additional mirrors 38, 39 supported by a carriage 20. The first additional mirror 38 is arranged adjacent to a line sensor 37, while the second additional mirror 39 is arranged adjacent to a focusing lens 36. In the illustrated embodiment, the first additional mirror 38 is located in front of the line sensor 37, while the second additional mirror 39 is located above the focusing lens 36.

According to the third embodiment, light converged by the focusing lens 36 is reflected by the first additional mirror 38 to be directed to the second additional mirror 39. Then, the light is reflected by the second additional mirror 39 to be directed to the line sensor 37. Finally, the light is received by the line sensor 37.

In the above manner, the overall length of the light paths is advantageously increased without compromising the compactness of the carriage 20. It should be noted that the number of the additional mirrors is not limited to two. Use may be made of only one additional mirror or more than two additional mirrors.

Figure 8:
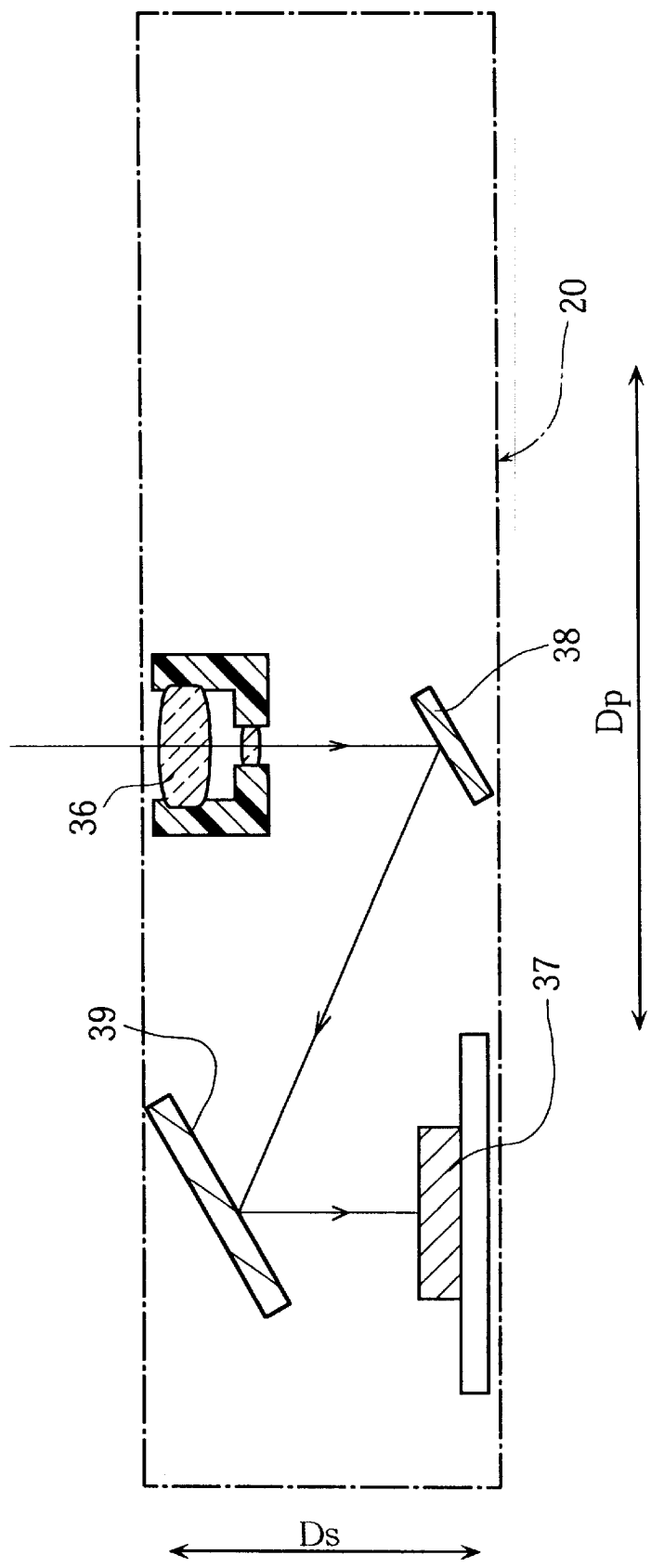
FIG. 8 is a sectional plan view illustrating principal components of an image scanner according to a fourth embodiment of the present invention.

FIG. 8 shows principal components of an image scanner according to a fourth embodiment of the present invention. In this embodiment again, use is made of two additional mirrors 38 and 39 supported by a carriage 20. As shown in the figure, a focusing lens 36 and a line sensor 37 are spaced from each other in a primary scanning direction Dp.

The first additional mirror 38 is spaced from the focusing lens 36 in a secondary scanning direction Ds, while the second additional mirror 39 is spaced from the line sensor 37 in the secondary scanning direction Ds. In this arrangement, the overall length of the light paths is advantageously increased.

In the preferred embodiments of the present invention, mirrors are used for reflecting means. Alternatively, a prism may be used instead of a mirror.

According to the present invention, the carriage 20 may be actuated by a driving mechanism including slide rods extending in the secondary scanning direction Ds. The carriage 20 may be slidably supported by the slide rods and moved when pulled by a suitable wire or belt attached to the carriage 20.

The present invention being thus described, it is obvious that the same may be varied in many other ways. Such variations should not be regarded as a departure from the spirit and scope of the present invention, and all such modifications as would be obvious to those skilled in the art are intended to be included within the scope of the following claims.

What is claimed is:

1. An image scanner comprising:
   a housing provided with a first and a second side portion which are spaced from each other in a predetermined direction;
   a document supporting panel fixed to the housing;
   a carriage which is arranged under the document supporting panel and movable in said predetermined direction;
   a light source supported by the carriage for illuminating a document placed on the document supporting panel;
   first reflecting means supported by the carriage for directing light from the document toward the first side portion of the housing, the first reflecting means comprising a first mirror;
   second reflecting means arranged at the first side portion of the housing for directing light from the first reflecting means toward the second side portion of the housing, the second reflecting means comprising a second and a third mirror;
   third reflecting means arranged at the second side portion of the housing for directing light from the second reflecting means toward the first side portion of the housing, the third reflecting means comprising a fourth and a fifth mirror;
   a focusing lens supported by the carriage for converging light from the third reflecting means; and
   a line sensor supported by the carriage for receiving the converged light;
   wherein the first mirror is arranged to direct light to the second mirror, the second mirror being arranged to direct light to the third mirror, the third mirror being arranged to direct light to the fourth mirror, the fourth mirror being arranged to direct light to the fifth mirror, the fifth mirror being arranged to direct light to the focusing lens; and
   wherein the second mirror is arranged under the third mirror, the fourth mirror being arranged above the fifth mirror.

2. The image scanner according to claim 1, wherein the focusing lens has an optical axis extending through the line sensor.

3. The image scanner according to claim 1, further comprising additional reflecting means mounted on the carriage for conducting the light converged by the focusing lens to the line sensor.

4. The image scanner according to claim 3, wherein the additional reflecting means comprises at least one additional mirror.

5. The image scanner according to claim 3, wherein the additional reflecting means comprises two additional mirrors, one of the additional mirrors being arranged adjacent to the focusing lens, the other of the additional mirrors being arranged adjacent to the line sensor.

6. The image scanner according to claim 5, wherein the focusing lens and the line sensor are offset from each other in a direction perpendicular to said predetermined direction.

7. The image scanner according to claim 6, wherein said one of the additional mirrors is spaced from the focusing lens in said predetermined direction, said the other of the additional mirrors being spaced from the line sensor in said predetermined direction.

8. The image scanner according to claim 1, further comprising driving means provided in the housing for reciprocating the carriage in said predetermined direction.

9. The image scanner according to claim 8, wherein the driving means includes a pair of racks fixed to the housing, a pair of pinions which are rotatably supported by the carriage and held in engagement with the racks, a motor mounted on the carriage for rotating the pinions, and a speed-reduction mechanism mounted on the carriage and associated with the pinions and the motor.

10. The image scanner according to claim 1, wherein the housing includes a cover member and a base member separate from the cover member.

11. The image scanner according to claim 10, wherein the third and the fourth mirrors are attached to the cover member, the second and the fifth mirrors being attached to the base member.

12. The image scanner according to claim 1, wherein the light source comprises a cold-cathode tube.

13. The image scanner according to claim 1, wherein the light source comprises a xenon lamp.

14. The image scanner according to claim 1, wherein the line sensor is provided with red, green and blue light-receiving elements for detecting color images.

15. A image scanner comprising:
a housing provided with a first and a second side portion which are spaced from each other in a predetermined direction;
a document supporting panel fixed to the housing;
a carriage which is arranged under the document supporting panel and movable in said predetermined direction;
a light source supported by the carriage for illuminating a document placed on the document supporting panel;
first reflecting means supported by the carriage for directing light from the document toward the first side portion of the housing;
second reflecting means arranged at the first side portion of the housing for directing light from the first reflecting means toward the second side portion of the housing;
third reflecting means arranged at the second side portion of the housing for directing light from the second reflecting means toward the first side portion of the housing;
a focusing lens supported by the carriage for converging light from the third reflecting means;
a line sensor supported by the carriage for receiving the converged light; and
an additional reflecting means mounted on the carriage for conducting the light converged by the focusing lens to the line sensor;
wherein the additional reflecting means comprising two additional mirrors, one of the additional mirrors being arranged adjacent to the focusing lens, the other of the additional mirrors being arranged adjacent to the line sensor;
wherein the focusing lens and the line sensor are offset from each other in a direction perpendicular to said predetermined direction; and
wherein said one of the additional mirrors is spaced from the focusing lens in said predetermined direction, said the other of the additional mirrors being spaced from the line sensor in said predetermined direction.

16. An image scanner comprising:
a housing provided with a first and a second side portion which are spaced from each other in a predetermined direction;
a document supporting panel fixed to the housing;
a carriage which is arranged under the document supporting panel and movable in said predetermined direction;
a light source supported by the carriage for illuminating a document placed on the document supporting panel;
first reflecting means supported by the carriage for directing light from the document toward the first side portion of the housing, the first reflecting means comprising a first mirror;
second reflecting means arranged at the first side portion of the housing for directing light from the first reflecting means toward the second side portion of the housing, the second reflecting means comprising a second and a third mirror;
third reflecting means arranged at the second side portion of the housing for directing light from the second reflecting means toward the first side portion of the housing, the third reflecting means comprising a fourth and a fifth mirror;
a focusing lens supported by the carriage for converging light from the third reflecting means; and
a line sensor supported by the carriage for receiving the converged light;
wherein the housing includes a cover member and a base member separate from the cover member; and
wherein the third and the fourth mirrors are attached to the cover member, the second and the fifth mirrors being attached to the base member.

17. An image scanner comprising:
a housing provided with a first and a second side portion which are spaced from each other in a predetermined direction;
a document supporting panel fixed to the housing;
a carriage which is arranged under the document supporting panel and movable in said predetermined direction;
a light source supported by the carriage for illuminating a document placed on the document supporting panel;
first reflecting means supported by the carriage for directing light from the document toward the first side portion of the housing, the first reflecting means comprising a first mirror;
second reflecting means arranged at the first side portion of the housing for directing light from the first reflecting means toward the second side portion of the housing, the second reflecting means comprising a second and a third mirror;
third reflecting means arranged at the second side portion of the housing for directing light from the second reflecting means toward the first side portion of the housing, the third reflecting means comprising a fourth and a fifth mirror;
a focusing lens supported by the carriage for converging light from the third reflecting means;
a line sensor supported by the carriage for receiving the converged light;
wherein the housing includes a cover member and a base member separate from the cover member; and wherein two of the second to fifth mirrors are attached to the cover member, the remaining two of second to fifth mirrors being attached to the base member.

18. An image scanner comprising:

a housing provided with a first and a second side portion which are spaced from each other in a predetermined direction;

a document supporting panel fixed to the housing;

a carriage which is arranged under the document supporting panel and movable in said predetermined direction;

a light source supported by the carriage for illuminating a document placed on the document supporting panel;

first reflecting means supported by the carriage for directing light from the document toward the first side portion of the housing;

second reflecting means arranged at the first side portion of the housing for directing light from the first reflecting means toward the second side portion of the housing;

third reflecting means arranged at the second side portion of the housing for directing light from the second reflecting means toward the first side portion of the housing;

a focusing lens supported by the carriage for converging light from the third reflecting means;

a line sensor supported by the carriage for receiving the converged light; and driving means provided in the housing for reciprocating the carriage in said predetermined direction;

wherein the driving means includes a pair of racks fixed to the housing, a pinion shaft rotatably supported on the carriage, a pair of pinions mounted on the pinion shaft in engagement with the racks, a motor mounted on the carriage for rotating the pinions, and a speed-reduction mechanism mounted on the carriage and associated with the pinions and the motor; and wherein the speed-reduction mechanism comprising at least a first and a second free-rotation gear mounted on the pinion shaft for freely rotating thereon, and another free-rotation gear mounted on an additional shaft for freely rotating thereon, each of the free-rotation gears having a larger gear portion and a smaller gear portion, the smaller gear portion of the first free-rotation gear being held in engagement with the larger gear portion of the additional free-rotation gear, the smaller gear portion of the additional free-rotation gear being held in engagement with the larger gear portion of the second free-rotation gear.

* * * * *